United States Patent [19]

Crewson et al.

[11] Patent Number: 4,858,729
[45] Date of Patent: Aug. 22, 1989

[54] BRAKE SUPPORT ASSEMBLY

[75] Inventors: Gary E. Crewson, Niagara Falls, Canada; David J. Pulliam, Birmingham, Mich.

[73] Assignee: Rockwell International Corporation, Pittsburgh, Pa.

[21] Appl. No.: 748,897

[22] Filed: Jun. 26, 1985

[51] Int. Cl.$^4$ .............................................. F16D 51/22
[52] U.S. Cl. ........................... 188/205 R; 188/206 A; 188/330; 188/341
[58] Field of Search .......... 188/205 R, 205 A, 206 A, 188/325, 327, 330, 341, 328

[56] References Cited

U.S. PATENT DOCUMENTS

| | | | |
|---|---|---|---|
| 4,337,851 | 7/1982 | Pringle | 188/250 C X |
| 4,452,347 | 6/1984 | Dozier | 188/18 R X |

Primary Examiner—Andres Kashnikow
Assistant Examiner—Matthew C. Graham

[57] ABSTRACT

A brake spider for supporting a brake assembly on a vehicle axle which includes a mounting portion and diametrically opposed, first and second support portions, a pair of laterally spaced bores through the second support portion and mounting a pair of anchor pins, and a boss adjacent each bore and projecting from oppositely disposed surfaces of the second support portion of the brake spider.

4 Claims, 3 Drawing Sheets

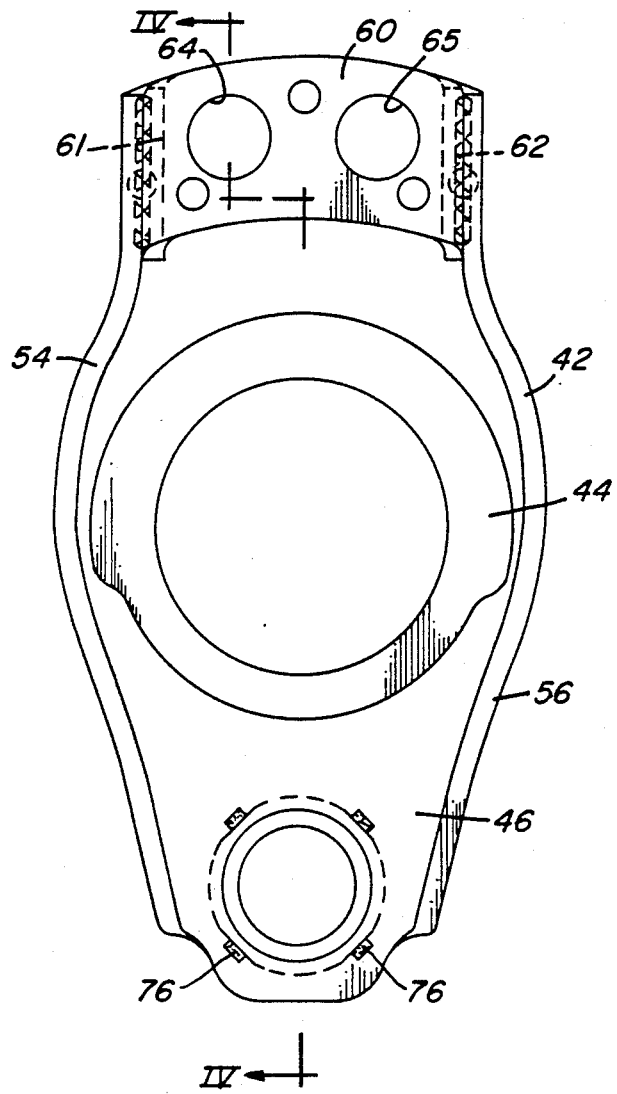
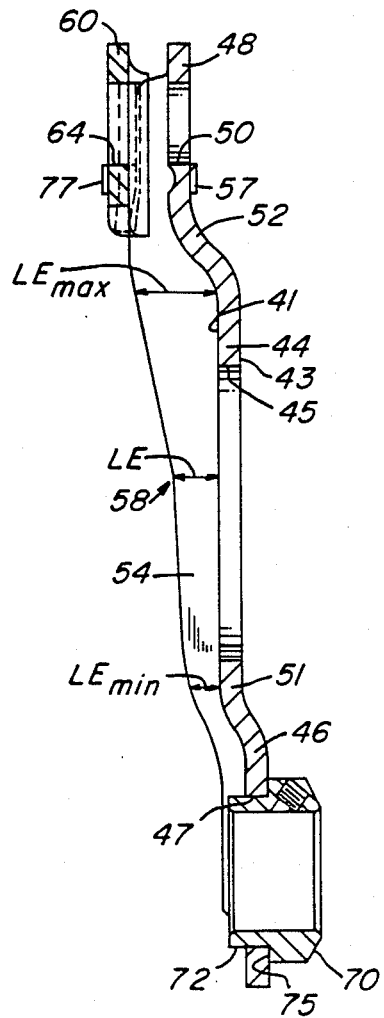

BRAKE SUPPORT ASSEMBLY

BACKGROUND OF THE INVENTION

1. Field of the Invention

The present invention is directed to a vehicle brake support assembly for an internally expanding drum brake assembly and, more specifically, to a metal plate and supporting assembly for a drum brake which is utilized in heavy duty truck and trailer axle configurations and usually includes a pair of dual web brake shoes and a rotary cam actuator.

2. Description of the Prior Art

Such brakes usually include a pair of brake shoes having adjacent ends seated for pivotal movement on a cylindrical surface of a pair of anchor pins mounted to a support plate, often referred to as a "spider" which in turn is secured to a vehicle axle or axle housing. The support plate is usually of elongate form and a rotatable actuating cam and shaft is mounted to the support plate at the end opposite the anchor pins with the cam disposed between the other ends of the brake shoes. During actuation, rotary movement of the cam causes each of the brake shoes to overcome the biasing force of a return spring and to pivot outwardly about the anchor pins into contact with the radially inwardly facing friction surface of a brake drum secured for rotation with a vehicle wheel.

For such heavy duty brake installations, the support plate or spider serves as the foundation of the brake assembly and, even though it does not constitute a moving part of the brake assembly, it is subject to and must withstand substantial stress under dynamic braking conditions. In this type of brake the rotary cam shaft is usually rotatably mounted to the support plate at a location spaced inwardly from a plane normal to the vehicle axle and passing through the center of the brake shoes and anchor pins. The support plate is therefore subject to substantial twisting forces as it transfers braking torque to the axle under dynamic braking conditions.

Support plates have therefore traditionally been formed as heavy cast and/or forged members with appropriate areas machined and bored to accommodate the anchor pins and the actuating shaft, and for mounting the support plate to the axle. Such traditional support plates have therefore been expensive to manufacture because of the mass of metal and the machining operations required and increased the weight of the vehicles thereby reducing the economics of operation thereof. Examples of such heavy duty cast and forged support plates or spiders are disclosed in U.S. Pat. Nos. 3,144,100, 3,279,569, 3,363,726, and 4,157,747.

Several attempts have been made to avoid the massive cast and forged brake spiders. U.S. Pat. Nos. 3,385,405, and 4,452,347 disclose the use of two plates secured together to provide a brake support assembly. U.S. Pat. Nos. 4,200,174 and 4,337,851 each disclose the use of a stamped brake spider or support plate.

SUMMARY OF THE INVENTION

The present invention provides a brake spider and a brake support assembly for a rotary cam actuated, heavy-duty vehicle brake which is less massive than traditional and state of the art brake spiders, is more economical to manufacture and assemble to the vehicle axle and provides means for spacing the brake shoe webs from the brake support assembly.

The present invention provides a brake spider and brake support assembly for a vehicle axle which includes a mounting portion and diametrically opposed, first and second support portions, a pair of laterally spaced bores through the second support portion and mounting a pair of anchor pins, and spacing means adjacent each bore and projecting from oppositely disposed surfaces of the second support portion of the spider.

In the preferred embodiment, the brake support assembly includes a stamped metal plate having a planar and circular mounting portion, diametrically opposed, planar first and second support portions, substantially parallel to and offset in opposite directions from the mounting portion, first and second transition sections respectively joining the first and second support portions to the mounting portion and a pair of reinforcing ribs with each rib extending continuously along opposite edges of the plate from the first support portion across the mounting portion and substantially across the second support portion. The reinforcing ribs project from the metal plate in substantially the same direction that the second support portion is offset from the mounting portion. A bracket extends across the second support portion in spaced relation thereto and is welded at its laterally spaced edges to the reinforcing ribs of the metal plate. A pair of axially aligned laterally spaced bores are provided through the second support portion and the bracket. An axially projecting boss is provided adjacent each of the bores in the second support portion of the plate and the bracket.

In the preferred embodiment a pair of sleeve-type bushings are each seated by means of an interference fit in one of the pairs of axially aligned bores in the second support portion and the bracket and the bosses are integrally formed with the second support portion and the bracket to project axially beyond the ends of the sleeve-type bushings.

These and other features and advantages of the invention will become apparent from the following detailed description of the embodiment shown by the accompanying drawings.

BRIEF DESCRIPTION OF THE DRAWINGS

In the drawings wherein like reference numerals refer to like parts. FIG. 3 is a side view of the brake support assembly of FIGS. 1 and 2; FIG. 4 is a view taken along line IV—IV of FIG. 3; and FIG. 5 is a view showing the upper end surface of the support assembly of FIG. 3.

DESCRIPTION OF THE INVENTION

Figure 1:
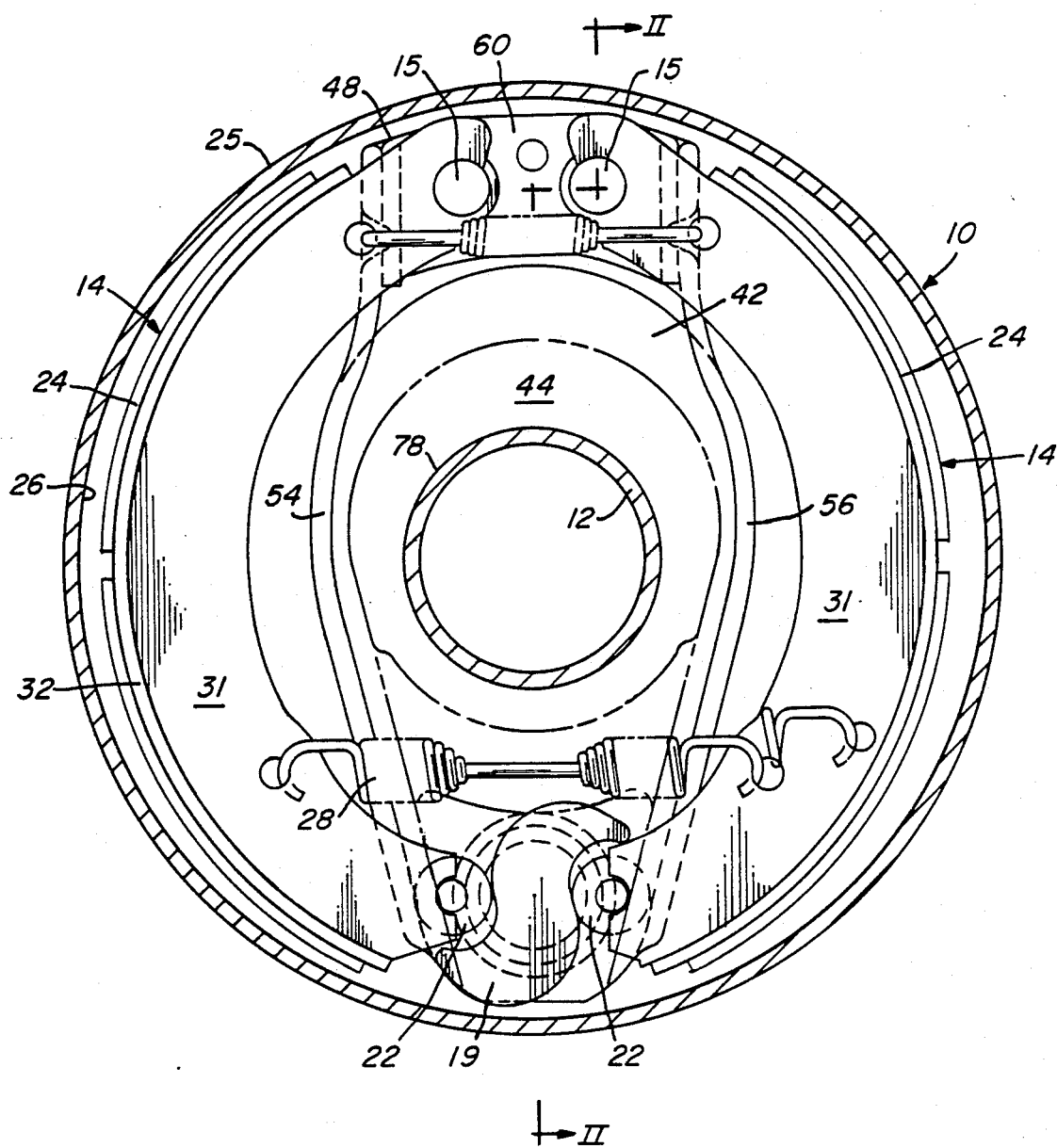
FIG. 1 is a side view, partly in section of a vehicle axle and brake assembly including the present invention.
Figure 2:
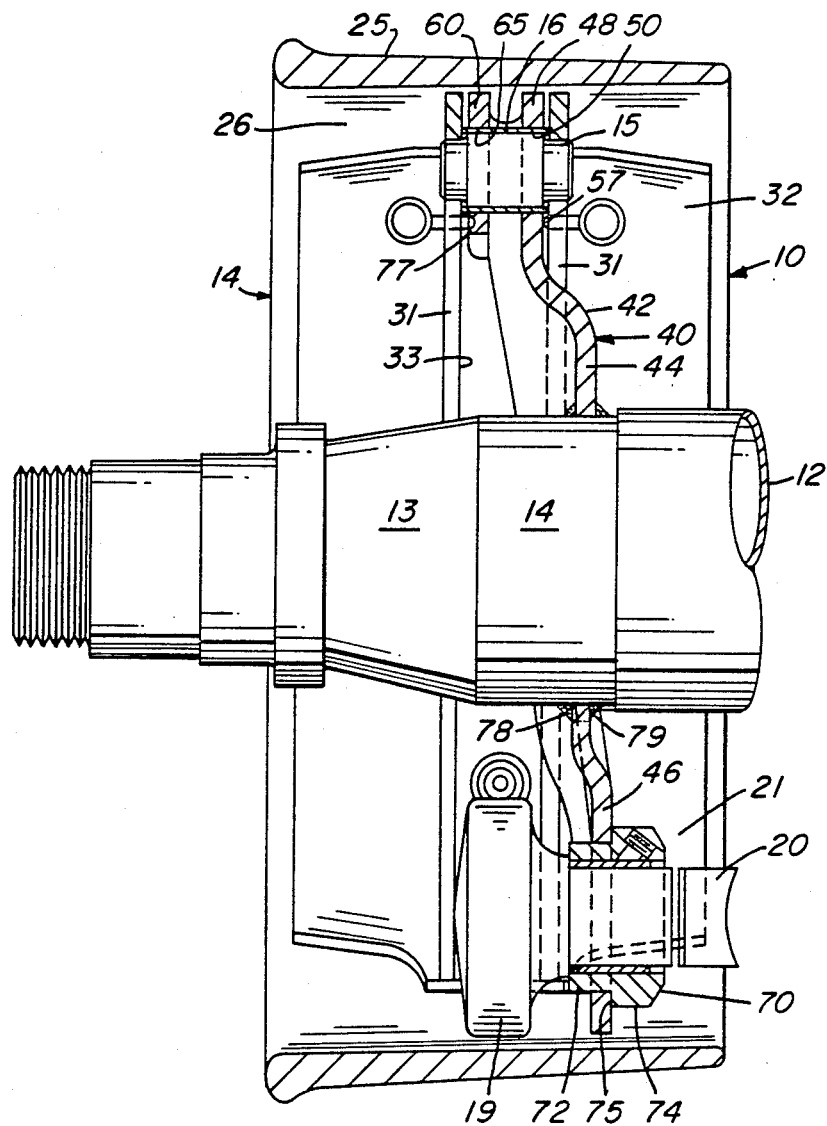
FIG. 2 is a view, partly in section, taken along line II—II of FIG. 1.

With reference to the drawings, there is shown a cam actuated brake assembly generally designated by the numeral 10. The brake assembly 10 is supported by a brake support assembly 40 rigid with a vehicle axle 12. The brake assembly 10 includes a pair of brake shoes 14 each of which is pivotally mounted at one end to a stepped cylindrical anchor pin 15 carried by the brake support assembly 40. The anchor pins 15 are each carried by a sleeve type bushing in cylindrical bores provided to the brake support assembly 40, as shown by FIG. 2. A cam 19 is mounted for rotary movement between the adjacent ends of the brake shoes 14 opposite from the anchor pins 15. The brake shoes 14 are each provided with a roller type cam follower 22. The cam is non-rotatably secured to a cam shaft 20 mounted to the brake support assembly 40 for rotary movement in a sleeve type bushing 21. The cam shaft is rotated by conventional means not shown to rock the cam 19 in a counter-clockwise direction through an arc in the range of 10° to 30°. The cam 19 provides an outwardly directed force to the rollers 22 and the brake shoes 14 which cause the brake shoes to pivot about the anchor pins 15. This movement forces the friction linings 24 into contact with the inwardly facing friction surface 26 of a brake drum 25 secured by conventional means to a wheel rotatably mounted to a spindle 13 at the outer end of axle 12. When the brakes are released the brake shoes 14 and the friction lining pads 24 are withdrawn from contact with the brake drum surface 26 by a return spring 28 secured at its opposite ends to the brake shoe webs 31.

Although only end end of the tubular axle 12 is shown in the drawings the other end of the axle 12 would be provided with a spindle 13, a cylindrical surface 14 adjacent the spindle 13 and a brake support assembly identical, but of opposite hand to the corresponding elements shown in FIG. 2.

The brake shoes 14 are dual web fabricated brake shoes. That is, each brake shoe includes a pair of axially spaced webs 31 secured to a table 32. The webs 31 are flat in a radial direction and curved in a longitudinal or circumferential direction. The brake shoe table 32 is curved in the circumferential direction and the webs 31 are welded in parallel relation along the interior curved portion of the table. This provides a generally rigid assembly of component parts to which the friction lining pads 24 may be secured by rivets or by chemical bonding.

With reference to FIGS. 3-5, the brake support assembly 40 is comprised of a stamped metal plate 42 which includes a substantially planar and circular mounting portion 44 and planar first and second support portions 46 and 48. As shown by FIG. 3, the first and second support portions 46 and 48 are diametrically opposed along the vertical axis. With reference to FIGS. 2 and 4, in the preferred embodiment, the first support portion 46 is axially offset about 7 1/16 inch to the right of the mounting portion 44 and the second support portion 48 is axially offset approximately 0.459 inch to the left of the mounting portion 44. A circular aperture 45 is provided through the mounting portion 44 and a circular aperture 47 is provided through the first support portion 46. A first transition section 51 joins the first support portion 46 to the mounting portion 44 and a second transition section 52 joins the second support portion 48 to the mounting portion 44. The stamped metal plate 42 is also formed with a pair of reinforcing ribs 54 and 56 extending continuously along opposite edges of the plate 42 from the first support portion 46 across the mounting portion 44 and substantially across the second support portion 48. The reinforcing ribs project from the metal plate 42 in substantially the same direction as the second support portion 48 is offset from the mounting portion 44, i.e. to the left as viewed in FIG. 4.

The linear extent of the projection of the ribs 54 and 56 is minimum in the area of the first support portion 46 and the first transition section 51 and increases as the ribs 54, 56 traverse the mounting portion 44. "Linear extent" means the distance from the edge of the rib measured normal to the surface of the mounting portion 44 of metal plate 42.

In the preferred embodiment, the linear extent of the projection of the ribs increases gradually to a fixed point 58 more than halfway across the mounting portion 44 and increases substantially more rapidly from that point to the second transition section 52.

With reference to FIG. 4, the linear extent of rib 54 is shown as increasing over a distance of 3 inches from a minimum linear extent $LE_{min}$ of about 9/16 inch at the first transition section 51 to a linear extent LE of about ¾ inch at the break point 58 just above the center line of the aperture 45 and then rapidly, over a distance of 3½ inches, increasing to a maximum linear extent $LE_{max}$ of 1 7/16 inches at the beginning of the second transition section 52. The slope or rate of displacement of the edge of ribs 54 and 56 relative to the surface 41 of mounting portion 44 is 0.06 from $LE_{min}$ to LE and the corresponding slope or rate of displacement from LE to $LE_{max}$ is 0.20 or substantially more than two times the rate of displacement from $LE_{min}$ to LE.

This is significant because the relatively slow rate of displacement of ribs 54 and 56 from $LE_{min}$ to LE provides adequate clearance for a weld head to be inserted to effect a continuous weld around the axle and the rapid increase in the rate of displacement from LE to $LE_{max}$ substantially strengthens the metal plate 42 without precluding weld head access to the aperture 45 around the cylindrical surface 14 of axle 12.

The metal plate 42, with the center planes of the first and second support portions 46 and 48 axially off-set on opposite sides of the mounting portion 44 and connected to the mounting portion 44 by the first and second transition sections 51 and 52 and with the linear extent or axial projection of the reinforcing ribs 54 and 56 increasing from the first transition section 51 to the second transition section 52, provides a relatively lightweight and cost effective integral structural form of substantially uniform thickness throughout which is capable of withstanding the stresses and torque encountered under dynamic braking conditions.

A bracket 60 is welded at its opposite ends or laterally spaced edges 61 and 62 to the ribs 54 and 56. The bracket 60 extends across and forms a box section at the second support portion 48 of metal plate 42. A pair of bores 64 and 65 in the bracket 60 are respectively axially aligned with bores 49 and 50 provided in the second support portion 48 of metal plate 42. A pair of stainless steel sleeve-type bushings 16, only one of which is shown in the drawings, are respectively seated in the bores 49 and 64 and 50 and 65. The ends of the sleeve-type bushings 16 of metal plate 42 are press fit to the bores in the bracket 60 and the second mounting portion 48 to secure the bushings 16 in place and thereby support the stepped cylindrical anchor pins 15.

An aperture 47 provided in the first support portion 46 receives and mounts a bushing retainer 70 having a sleeve-type bushing 21 seated internally of a bore 71. The bushing retainer 70 is formed with first and second external cylindrical surfaces 72, 74 concentric with the bore 71 and separated by a shoulder 75. The smaller diameter external surface 72 is dimensioned to fit in the aperture 47 where it is secured to the first support portion 46 of metal plate 42 by a plurality of welds 76.

The sleeve-type bushing 21 internal of bushing retainer 70 rotatably mounts the shaft 20 of cam 19.

The metal plate 42 is formed as a stamped part from a blank cut from 3/8" thick SAE 50 XLF, high-strength, low alloy, hot rolled steel sheet strip with the mounting portion 44, both support portions 46 and 48, both transition sections 51 and 52 and both reinforcing ribs 54 and 56 all of substantially the same thickness. The aperture 45 in the mounting portion 44 and the aperture 47 in the first support portion 46 are formed during the stamping operation and the dimensions of the stamped apertures 45 and 47 are held within tolerances so as to insure satisfactory fit to the cylindrical surface 14 of axle 12 and to the bushing retainer 70 with no additional machining required.

The aperture resulting from stamping and forming the metal plate 42 defines an edge 45 between the opposite surfaces 41 and 43 of the mounting portion 44.

The bores 49 and 50 at the second support portion 48 of metal plate 42 are rough punched in the stamping operation and machined with the bracket bores 64 and 65 after the bracket 60 has been welded to the reinforcing ribs 54 and 56.

The bracket 60 is preferably stamped from a blank cut from 5/16" thick hot rolled steel sheet strip with the bores 64 and 65 rough punched through the blank.

During the stamping operation the second support portion 48 of the metal plate 42 nad the bracket 60 are also pressed to provide a plurality of bosses 57 and 77. As shown by FIGS. 4 and 5, the bosses 57 and 77 are raised from opposite sides of the second support portion 48 of metal plate 42 and the bracket 60 in the brake support assembly 40. the bosses 57, 77 are pressed from the opposite surfaces of the metal plate 42 and thickness of the second support portion 48 of the brake support assembly 40 within acceptable tolerances. The bosses 57 and 77 extend about 0.05 inch from the surface of the second support portion 48 and the bracket 60 respectively and extend a greater axial distance than the end of the sleeve-type bushings 16 in bores 49 and 64 and bores 50 and 65. As shown by FIG. 2 a pair of aligned and oppositely disposed bosses 57 and 77 are positioned opposite the internal spaced surfaces 33 of the brake shoe webs 31 of each brake shoe 14 and provide a bearing surface spacing the brake shoe webs 31 away from the ends of the sleeve-type bushings 16 as well as the second support portion 48 of the metal plate 42 and the bracket 60.

During assembly, the brake support assembly 40 is pressed onto the cylindrical surface 14 adjacent the spindle 13 of axle 12 with the mounting portion 44 of metal plate 42 extending substantially normal to the longitudinal axis of axle 12 and with the aperture edge 45 seated on the cylindrical surface 14. Continuous weld joints 78 and 79 are then provided between the opposite surfaces 41 and 43 of the mounting portion 44 of metal plate 42 and the cylindrical surface 14 of axle 12. The weld joints 78 and 79 not only secure the brake support assembly 40 to the axle 12, they also stiffen the brake support assembly 40 and together with the structural form of the stamped metal plate 42 provide a fabricated brake support assembly 40 of sufficient structural integrity to withstand the stresses and torque encountered under dynamic braking conditions without the use of a heavy cast or forged member and with a minimum of machining operations thereby rendering operation of the vehicle and the manufacturing process more economical.

The invention may also be embodied in other specific forms without departing from the spirit or essential characteristics thereof. The foregoing description is therefore to be considered as illustrative and not restrictive, the scope of the invention being defined by the appended claims, and all changes which come within the meaning and range of equivalency of the claims are therefore intended to be embraced thereby.

We claim:

1. A brake spider for mounting on a vehicle axle and supporting a pair of brake shoes and an actuator comprising:
    a spider having a mounting portion and diametrically opposed first and second support portions,
    a pair of laterally spaced bores through said second support portion and mounting a pair of anchor pins, and
    spacing means comprising a plurality of bosses projecting from oppositely disposed surfaces of said second support portion of said spider with at least one boss on each said surface adjacent to and spaced from each of said bores.

2. The brake spider defined by claim 1 wherein said second support portion of said spider is formed by a plate and a bracket secured in spaced parallel relationship and said bosses project from oppositely disposed surfaces of said plate and said bracket.

3. A brake support assembly to be mounted on a vehicle axle for supporting a pair of brake shoes and an actuator comprising
    a stamped metal plate having a substantially planar and circular mounting portion,
    a circular aperture through said mounting portion,
    diametrically opposed, planar first and second support portions substantially parallel to and off-set in opposite directions from said mounting portion,
    an aperture through said first support portion of said plate,
    first and second transition sections respectively joining said first and second support portions to said mounting portion,
    a pair of reinforcing ribs with each rib extending continuously along opposite edges of said plate from said first support portion to said second support portion and projecting from said plate in the direction that said second support portion is off-set from said mounting portion,
    a bracket extending across said second mounting portion in spaced relation thereto and secured by laterally spaced edges welded to said ribs,
    a pair of laterally spaced bores through said second support portion,
    a pair of bores through said bracket, each of said bores through said bracket being axially aligned with and of the same diameter as a corresponding one of said bores through said second support portion, and
    a boss adjacent each of said bores in said bracket and said second support portion.

4. The brake support assembly defined by claim 3 including a pair of sleeve-type bushings with each said bushing seated in and projecting beyond the edges of each pair of axially aligned bore and each said boss projects a greater axial distance than the ends of said sleeve-type bushings.

* * * * *